(12) United States Patent
Wang et al.

(10) Patent No.: US 8,709,677 B2
(45) Date of Patent: Apr. 29, 2014

(54) PROTON CONDUCTING ELECTROLYTES WITH CROSS-LINKED COPOLYMER ADDITIVES FOR USE IN FUEL CELLS

(75) Inventors: Keping Wang, Richmond (CA); Jing Li, Surrey (CA); Yunsong Yang, Surrey (CA)

(73) Assignees: Daimler AG, Stuttgart (DE); Ford Motor Company, Dearborn, MI (US)

( * ) Notice: Subject to any disclaimer, the term of this patent is extended or adjusted under 35 U.S.C. 154(b) by 274 days.

(21) Appl. No.: 13/039,432

(22) Filed: Mar. 3, 2011

(65) Prior Publication Data

US 2012/0225372 A1 Sep. 6, 2012

(51) Int. Cl.
*H01M 8/10* (2006.01)
*C08G 77/60* (2006.01)

(52) U.S. Cl.
USPC ........... 429/492; 429/479; 429/489; 429/314; 428/447; 428/446; 528/10

(58) Field of Classification Search
USPC ......... 429/493, 480, 492, 434, 314, 479, 489; 428/305.5, 447, 446; 528/10
See application file for complete search history.

(56) References Cited

U.S. PATENT DOCUMENTS

| | | | | |
|---|---|---|---|---|
| 6,949,616 B2 * | 9/2005 | Jacob et al. | | 528/32 |
| 7,064,226 B2 * | 6/2006 | Sullivan et al. | | 556/404 |
| 7,309,523 B2 * | 12/2007 | Roziere et al. | | 428/305.5 |
| 2003/0032739 A1 * | 2/2003 | Kerres et al. | | 525/535 |
| 2004/0053060 A1 * | 3/2004 | Roziere et al. | | 428/447 |

FOREIGN PATENT DOCUMENTS

| | | |
|---|---|---|
| EP | 1323767 A2 | 7/2003 |
| WO | WO 02055587 A1 * | 7/2002 |

OTHER PUBLICATIONS

International Search Report and Written Opinion dated May 8, 2012.

\* cited by examiner

*Primary Examiner* — Michael Bernshteyn
(74) *Attorney, Agent, or Firm* — Patent Central LLC; Stephan A. Pendorf

(57) ABSTRACT

A proton conducting polymer electrolyte comprising a proton conducting ionomer cross-linked with an amount of a copolymer additive comprising cross-linking functional groups and other functional groups (e.g. proton carriers, chelating agents, radical scavengers) shows improved durability over the ionomer alone and provides for more stable inclusion of these other functional groups. The copolymer additive comprises at least two types of metal oxide monomers, one having cross-linking functional groups and the other having the other functional groups.

19 Claims, 4 Drawing Sheets

PROTON CONDUCTING ELECTROLYTES WITH CROSS-LINKED COPOLYMER ADDITIVES FOR USE IN FUEL CELLS

FIELD OF THE INVENTION

This invention relates to improved proton conducting polymer electrolytes for use in polymer electrolyte fuel cells. More specifically, it relates to electrolytes comprising an ionomer cross-linked with a copolymer additive comprising both cross-linking and other useful functional groups.

DESCRIPTION OF THE RELATED ART

Solid polymer electrolyte fuel cells convert reactants, namely fuel (such as hydrogen) and oxidant (such as oxygen or air), to generate electric power. Such fuel cells generally employ a proton conducting polymer membrane electrolyte between two electrodes, namely a cathode and an anode. A structure comprising a proton conducting polymer membrane sandwiched between two electrodes is known as a membrane electrode assembly (MEA). MEA durability is one of the most important issues for the development of fuel cell systems in either stationary or transportation applications. For automotive applications, an MEA is required to demonstrate durability of about 6,000 hours.

The membrane serves as a separator to prevent mixing of reactant gases and as an electrolyte for transporting protons from anode to cathode. Perfluorosulfonic acid (PFSA) ionomer, e.g., Nafion®, has been the material of choice and the technology standard for membranes to date. Nafion® consists of a perfluorinated backbone that bears pendent vinyl ether side chains, terminating with $SO_3H$.

Failure of the membrane as an electrolyte will result in decreased performance due to increased ionic resistance, and failure of the membrane as a separator will result in fuel cell failure due to mixing of anode and cathode reactant gases. The chemical degradation of PFSA membranes during fuel cell operation is proposed to proceed via the attack of hydroxyl (.OH) or peroxyl (.OOH) radical species on weak groups (such as a carboxylic acid group) on the ionomer molecular chain. The free radicals may be generated by the decomposition of hydrogen peroxide with impurities (such as $Fe^{2+}$) in a Fenton type reaction. In fuel cells, hydrogen peroxide can be formed either at Pt supported on carbon black in the catalyst layers or during the oxygen reduction reaction.

The hydroxyl radical attacks the polymer unstable end groups to cause chain zipping and/or could also attack an $SO_3^-$ group under dry conditions to cause polymer chain scission. Both attacks degrade the membrane and eventually lead to membrane cracking, thinning or forming of pinholes. The membrane degradation rate is accelerated significantly with increasing of the operation temperature and with decreasing inlet gas relative humidity (RH).

Numerous modifications and/or additives to the membrane electrolyte have been studied for purposes of improving the performance and/or durability of the membrane. For example, with regards to durability, US2008/0152986 discloses an impregnated cross-linked or non-cross-linked basic polymer (e.g. poly(benzimidazole)) membrane prepared with an acidic dopant (e.g. a phosphoric acid or an organic phosphonic acid) in order to obtain a polymer electrolyte membrane. Such membranes have good dimensional stability but generally do not have good conductivity at low temperature (<100° C.). In addition, the acid dopant leaches out of the membrane with time during fuel cell operation.

In US2006/0199062, a polymer blend of perfluorocarbonsulfonic acid resin and a polyazole-based compound or polymer was used as the proton conducting electrolyte. The strong interaction between the two decreases hydrogen crossover and improves durability of the membrane. However, this interaction also dramatically decreases the proton conductivity and hence the performance of the membrane electrolyte.

Cross-linking the electrolyte membranes generally improves durability. In U.S. Pat. No. 6,733,914, a cross-linked proton exchange membrane was prepared using aqueous ammonia to treat Nafion® precursor film. The cross-linking groups in this member were sulfonamide. US2002/0091201 discloses a general technique to create cross-links in perfluorinated polymers in which the cross-links or bonds are between sulfonyl groups attached to adjacent polymeric chains. However, such cross-linking reduces the number of sulfonic acid groups in the membrane, and thus while it improves durability, it also results in lower proton conductivity and performance of the membrane as well.

In US2010/0040927, a process was disclosed for producing a graft polymer electrolyte film for a fuel cell. This graft electrolyte is heterogeneous and has a silane-cross-linked structure between the graft molecule chains. However, its vinyl structure has been proved to be unstable in the fuel cell environment.

Further, WO2005/027240 describes the preparation of phosphonic acid grafted hybrid inorganic-organic polymers with a metal oxide backbone. The polymers can be used directly as proton conducting electrolyte membranes in fuel cells. The phosphonic acid groups allow proton conduction through the membrane under low RH. Composites comprising these polymers and other basic polymers are also suggested therein.

US2007/0154764 discloses electrolyte additives including hygroscopic particles made of metal oxide, such as silica or zirconium dioxide, heteropoly acids, phosphonate silica, etc. in order to increase water retention and thereby improve MEA performance under low RH conditions.

WO2005/036687 discloses a water insoluble additive comprising a metal oxide cross-linked matrix having phosphonic acid groups covalently attached to the matrix through linkers. The additive can then be homogeneously dispersed throughout a proton conducting membrane and improve ionic conductivity of the membrane at high temperatures (>100° C.).

US2006/0141313 discloses particles comprising a metal-oxygen cross-linked structure as an additive for a proton conducting membrane. The particles have an acid group such as a sulfonic acid group incorporated in the surface thereof. However, these and many other additives in the prior art are prone to being leached out from the membrane during fuel cell operation, either because they are water soluble or because they have no covalent bonding or no strong interaction with the host polymer.

Many different functional groups may also be incorporated into proton conducting electrolytes for various reasons. US2004/0043283 discloses incorporating metal elements or compositions containing metal elements or metal alloys that act as free radical scavengers or hydrogen peroxide decomposition catalysts. US2006/0046120 discloses the use of phenol type antioxidants where the antioxidant can be a small molecule or a polymer. And U.S. Pat. No. 6,607,856 discloses a solid polymer electrolyte having high-durability and oxidation resistance which is prepared by introducing a chelate group and an electrolyte group into a polymer electrolyte material having a hydrocarbon part. The chelating agents reduce the formation of free radicals. The presence of such additives in the MEA may however result in reduced performance of the fuel cell.

Indeed, all the aforementioned suggested modifications and additives may suffer from one or more of the following problems: reduced proton conductivity of the electrolyte, insufficient membrane durability, or additives that leach out over time from the electrolyte during fuel cell operation. Accordingly, there remains a need for improved electrolytes for MEAs in polymer electrolyte fuel cells. This invention fulfills these needs and provides further related advantages.

SUMMARY

Proton conducting electrolytes with improved durability and other desirable features can be obtained by cross-linking certain copolymer additives to suitable host proton conducting ionomers. The copolymer additives comprise both cross-linking functional groups and other functional groups that can provide additional desired properties to the electrolyte. The other functional groups include proton carriers, metal chelating groups, and radical scavengers. The proton conducting ionomer and the copolymer are bonded together at the cross-linking functional groups of the copolymer. This cross-linking or bonding provides durability and improved mechanical properties in general, while also serving to more reliably attach the other functional groups and thereby prevent them from leaching out over time. The electrolyte may contain other polymers or ionomers, but basic ionomers may desirably be excluded.

The copolymer additives specifically comprise a polymerized network of a plurality of metal oxide monomers with cross-linking functional groups and a plurality of metal oxide monomers with other functional groups in random sequence. The polymerized network is characterized by an alternating series of oxygen and metal bonds.

The metal oxide monomers with cross-linking functional groups comprise:
a first metal bonded to at least two oxygen atoms and selected from the group consisting of Si, Ti, Zr, Ce, Ta, and Cr, and
cross-linking functional groups bonded to the first metal and comprising a functional end group containing nitrogen or oxygen and characterized by a chemical structure selected from the group consisting of: —$NH_2$, =NH, -(aliphatic)-OH or -(aryl)-OH,

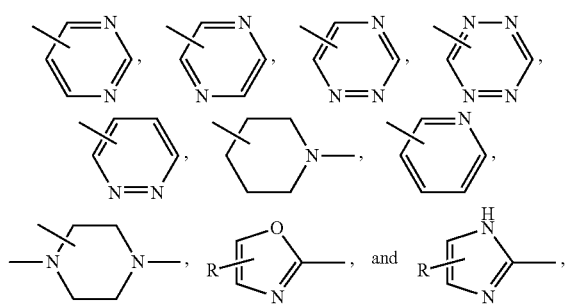

wherein R is a hydrocarbon group.

The metal oxide monomers with other functional groups comprise:
a second metal bonded to at least two oxygen atoms and selected from the group consisting of Si, Ti, Zr, Ce, Ta, and Cr, and other functional groups bonded to the second metal and selected from the group consisting of:
i) proton carrier functional groups comprising a functional end group selected from the group consisting of —$PO_3H_2$, —COOH, —$SO_3H$, and —$SO_2NHSO_2CF_3$,
ii) metal chelating functional groups comprising a functional end group selected from the group consisting of phosphonic acid, bipyridine, phenanthroline, and the like, and derivatives thereof, and
iii) free radical scavenger functional groups comprising a functional end group selected from the group consisting of aminophenyl, hydroxyphenyl, and the like, and derivatives thereof.

The first and second metals in the two types of monomers can conveniently be the same metal, and particularly can be Si. Such copolymers therefore have a silicon-oxygen backbone.

The cross-linking functional groups can further have a chemical structure of the form —X-(end group) wherein X is a linear chain comprising a number of $CH_2$, O, NH, or aryl groups in random sequence. As demonstrated in the Examples below, the cross-linking functional groups can particularly be —$(CH_2)_2$—$NH_2$, -phenyl-$NH_2$, or —$(CH_2)_3$-(1H-benzimidazol-2-yl).

The other functional groups can be proton carrier functional groups comprising an end group selected from the group consisting of —$PO_3H_2$, —COOH, —$SO_3H$, and —$SO_2NHSO_2CF_3$. These proton carrier functional groups can have a chemical structure of the form —Y-(end group) wherein Y is a linear chain comprising a number of $CH_2$, $CF_2$, or aryl groups in random sequence. Again as demonstrated in the Examples below, the proton carrier functional groups can particularly be —$(CH_2)_2$—$PO_3H_2$. Further, the ratio of cross linking functional groups to proton carrier functional groups in the copolymer can be from about 1:9 to 3:7.

More than one type of functional group may be employed in the copolymer additives. For instance, the polymerized network can comprise at least two different metal oxide monomers with other functional groups, such as both a plurality of metal oxide monomers with proton carrier functional groups and a plurality of metal oxide monomers with free radical scavenger functional groups. Exemplary free radical scavenger functional groups are -3-nitro-4-aminophenyl.

The host proton conducting ionomer can comprise sulfonic acid groups, and in particular can be a perfluorosulfonic acid ionomer. An effective amount of copolymer additive in the ionomer may be from about 5% to 10% by weight of the electrolyte.

The electrolytes of the invention are suitable for use in solid polymer electrolyte fuel cells. Along with improved durability, mechanical and chemical properties, fuel cell performance can even be improved under certain operating conditions, such as when operating at temperatures greater than 95° C. and at relative humidity less than 50% RH.

The electrolytes may be made by mixing an amount of the copolymer with an amount of the proton conducting ionomer, and then heating the mixture such that the copolymer bonds to the proton conducting ionomer. Several different sequences may be used in the preparation.

One possible approach comprises preparing the copolymer, adding the copolymer to a dispersion comprising the proton conducting ionomer, removing solvent from the dispersion thereby providing a solid mixture of the copolymer and the proton conducting ionomer, and then heating the mixture.

Another possible approach comprises adding the metal oxide monomers with cross-linking functional groups and the metal oxide monomers with other functional groups to a dispersion comprising the proton conducting ionomer thereby making the copolymer in situ in the dispersion, removing solvent from the dispersion thereby providing a solid mixture of the copolymer and the proton conducting ionomer, and then heating the mixture.

Yet another approach comprises preparing the copolymer, adding the copolymer to a dispersion comprising a precursor for the proton conducting ionomer, removing solvent from the dispersion thereby providing a solid mixture of the copolymer and the precursor, heating the mixture, and then converting the precursor to the proton conducting ionomer.

The copolymer may be prepared by preparing a solution comprising the metal oxide monomers with cross-linking functional groups and the metal oxide monomers with other functional groups, and heating the solution to a reaction temperature (e.g. greater than or about 50° C.) for a period of time (e.g. greater than or about 3 days) thereby forming the copolymer in solution.

In the method, the metal oxide monomers with cross-linking functional groups may be prepared by hydrolyzing unhydrolyzed metal oxide monomers with cross-linking functional groups. Exemplary unhydrolyzed metal oxide monomers with cross-linking functional groups include 3-aminopropyl-trimethoxysilane, aminophenyl-trimethoxysilane, or 3-(1H-benzimidazol-2-yl)propyl-trimethoxysilane.

Further, the metal oxide monomers with other functional groups can be prepared by hydrolyzing unhydrolyzed metal oxide monomers with other functional groups. Exemplary unhydrolyzed metal oxide monomers with other functional groups include (2-diethylphosphatoethyl)triethoxysilane and 3-nitro-4-amino-phenyltriethoxysilane.

With regards to both types of metal oxide monomers, the hydrolyzing step and the making of the copolymer can be performed in the same solution.

The invention includes proton conducting polymer electrolytes, fuel cells comprising such electrolytes (such as in the membrane or catalyst layers), and methods of preparing such composite electrolytes and fuel cells.

These and other aspects of the invention are evident upon reference to the attached Figures and following detailed description.

BRIEF DESCRIPTION OF THE DRAWINGS

FIG. 2a shows an example of a covalently bonded electrolyte and FIG. 2b shows an example of an acid-base bonded electrolyte.

DETAILED DESCRIPTION

Proton conducting electrolytes with improved durability and other desirable features can be obtained by bonding certain copolymer additives to suitable host proton conducting ionomers. The copolymer additives comprise both cross-linking functional groups and other functional groups that are useful for various other purposes. The proton conducting ionomer and the copolymer are bonded together at the cross-linking functional groups of the copolymer.

Herein, "proton conducting ionomer" refers to acidic ionomers characterized by a significant capability for proton conduction (and thus does not include basic ionomers). And with regards to the copolymer and the ionomer being "bonded together", this means the two are either covalently bonded or acid-base complexed together.

Figure 1:
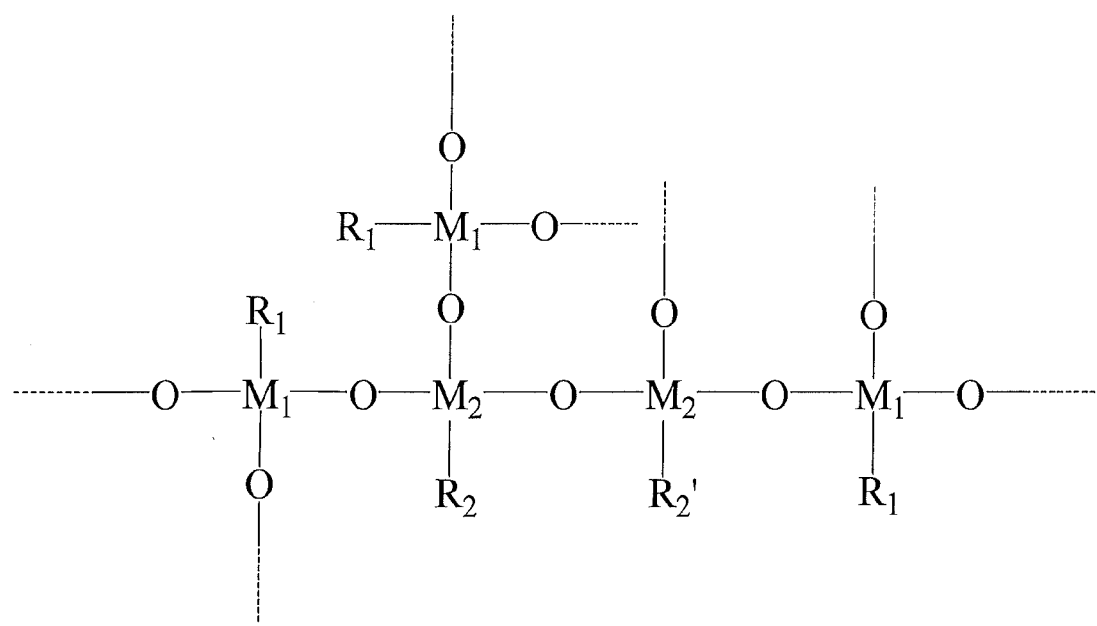
FIG. 1 depicts the chemical structure of a copolymer with an exemplary metal oxide network and with general functional groups.

The chemical structure of a suitable copolymer is exemplified in FIG. 1. A portion of the overall structure is shown and comprises an exemplary metal oxide network and general functional groups. The metal oxide network is generally a polymerized network of two types of metal oxide monomers and is characterized by an alternating series of oxygen and metal bonds. One type of metal oxide monomer comprises cross-linking functional groups, represented by $R_1$ in FIG. 1. The other type of metal oxide monomer comprises other functional groups, represented by $R_2$ and $R_2'$ in FIG. 1. The metals in these two types of monomers are represented by $M_1$ and $M_2$ respectively in FIG. 1. The two types of monomers can appear in random or block sequence in the copolymer and thus numerous configurations are possible for the network (including variations in chain length, branches, etc.). Thus only an exemplary, partial structure for the network is shown in FIG. 1. Those of ordinary skill in the art will appreciate the numerous variations possible for the configuration for the network.

The metals in both types of monomer are bonded to at least two oxygen atoms and thus are capable of forming a large polymeric network. Although not shown in FIG. 1, either of the monomers making up the copolymer may comprise more than two oxygen atoms. The metals ($M_1$, $M_2$) in both types of monomer may be selected from the group consisting of Si, Ti, Zr, Ce, Ta, and Cr.

The cross linking functional groups $R_1$ in the metal oxide monomers with cross-linking functional groups are bonded to the metals $M_1$. The various cross-linking functional groups which may be considered here comprise a functional end group containing nitrogen or oxygen and are characterized by a chemical structure selected from the group consisting of $—NH_2$, $=NH$, -(aliphatic)-OH, -(aryl)-OH,

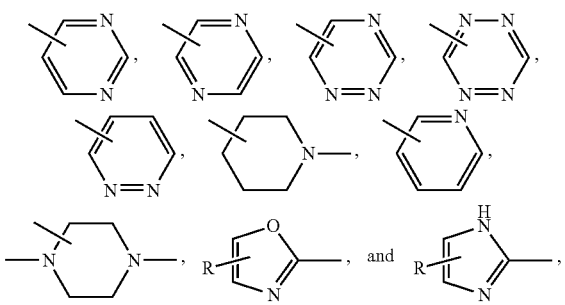

wherein R is a hydrocarbon group. The cross-linking functional groups can further have a chemical structure of the form —X-(end group) wherein X is a linear chain comprising a number of $CH_2$, O, NH, or aryl groups in random sequence. The cross-linking functional groups $—(CH_2)_2—NH_2$, -phenyl-$NH_2$, and $—(CH_2)_3—$(1H-benzimidazol-2-yl) have been demonstrated as suitable in the Examples to follow. Because the copolymer may bond to the proton conducting ionomer either via covalent bonding or acid-base complexing, the cross-linking functional groups include groups such as amino, hydroxy, pyridine, imidazole, and benzimidazole.

The functional groups $R_2$ and $R_2'$ in the metal oxide monomers with other functional groups are bonded to the metals $M_2$. The other functional groups which may be considered here fall into one of three different types: proton carrier, metal chelating, and/or free radical scavenger functional groups.

Suitable proton carrier functional groups comprise an end group selected from the group consisting of $—PO_3H_2$, $—COOH$, $—SO_3H$, and $—SO_2NHSO_2CF_3$. These proton carrier functional groups can have a chemical structure of the form —Y-(end group) in which Y is a linear chain comprising a number of $CH_2$, $CF_2$, or aryl groups in random sequence. (A $CF_2$ perfluoro structure may be preferred since the strong electron withdrawing power of the perfluoro units increase the acidity of the proton carrier end group, thereby increasing proton conductivity of final electrolyte.) The proton carrier functional group $—(CH_2)_2—PO_3H_2$ was used successfully in the Examples to follow. In general, sulfonic acid functional groups are expected to provide higher proton conductivity than phosphonic acid or carboxylic acid functional groups. However, a phosphonic acid functional group also serves as a good metal ion chelator and thus can serve more than one purpose here.

Suitable metal chelating functional groups comprise a functional end group selected from the group consisting of phosphonic acid, bipyridine, phenanthroline, and the like, and derivatives thereof.

Suitable free radical scavenger functional groups comprise a functional end group selected from the group consisting of aminophenyl, hydroxyphenyl, and the like, and derivatives thereof. The free radical scavenger functional group 3-nitro-4-aminophenyl was found to be suitable in the Examples to follow.

More than one type of other functional group (i.e. where $R_2$ is not the same as $R_2'$ in FIG. 1) may be employed in the copolymer additives. For instance, the polymerized network can comprise at least two different metal oxide monomers with other functional groups, such as both a plurality of metal oxide monomers with proton carrier functional groups and a plurality of metal oxide monomers with free radical scavenger functional groups.

Also, while the two metals $M_1$, $M_2$ in the different monomers may be different, it can be advantageous for them to be the same. Si for instance is a preferred metal for both types of monomer.

Along with numerous choices for the types of functional groups in the copolymer, the relative amounts of these various functional groups may also be varied widely in accordance with the properties desired.

Figure 2A:
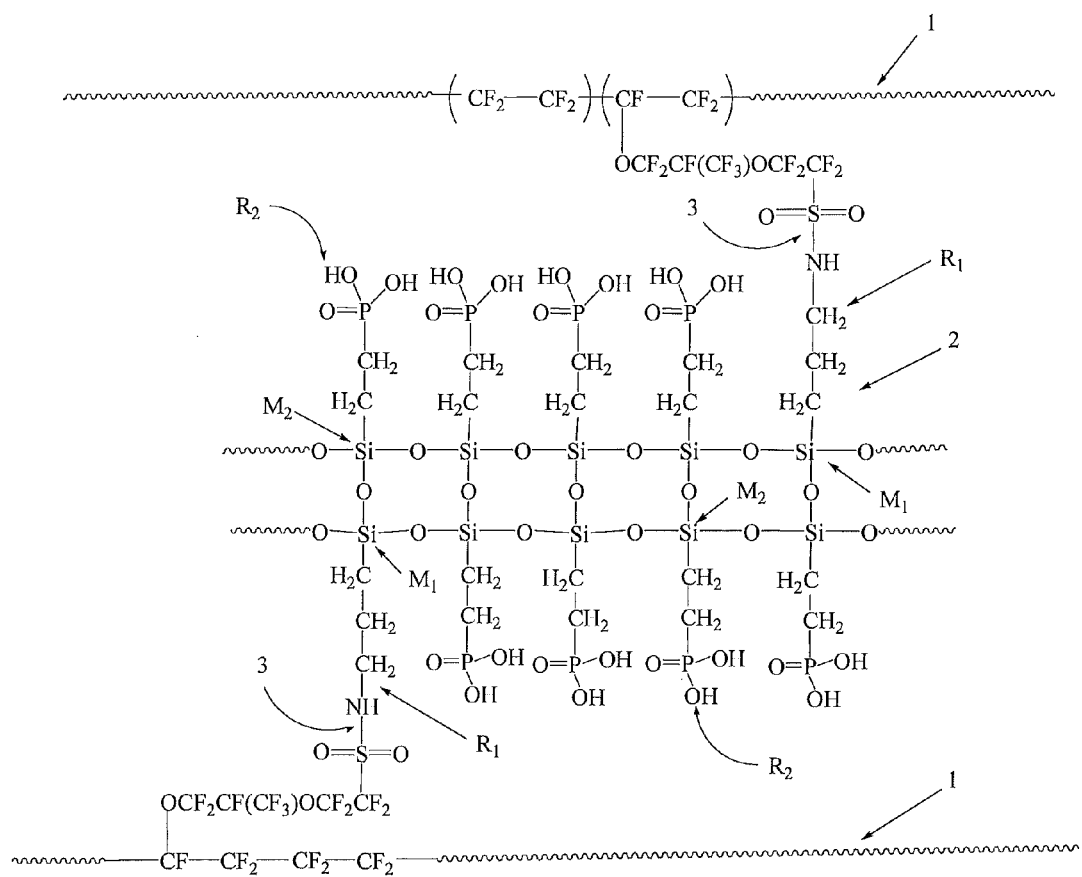
FIGS. 2a and 2b show exemplary proton conducting electrolytes comprising a perfluorosulfonic acid ionomer cross-linked to a copolymer having a silicon oxide network and with cross-linking and proton carrier functional groups.
Figure 2B:
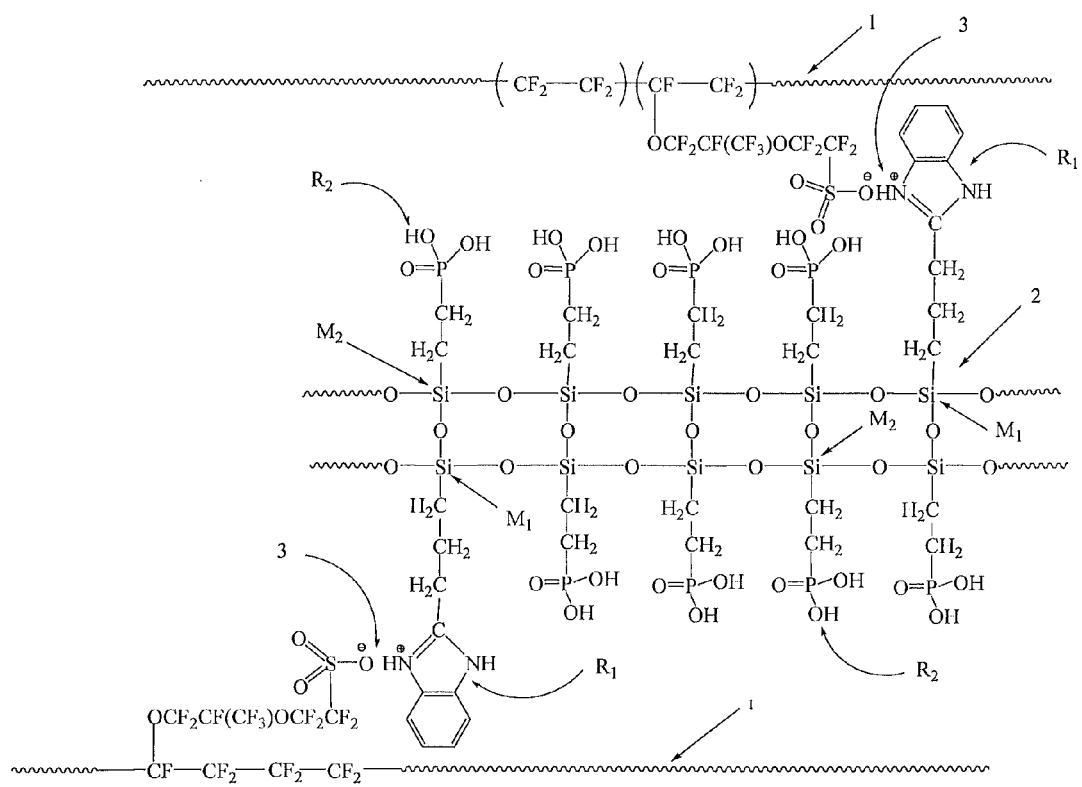

A proton conducting electrolyte of the invention comprises a proton conducting ionomer and the copolymer described above. A portion of the electrolyte structure is exemplified in FIGS. 2a and 2b. The exemplary polymer electrolyte of FIG. 2a comprises perfluorosulfonic acid ionomer 1 cross-linked via covalent bonding at locations 3 to copolymer 2. Here, copolymer 2 is a silicon oxide network (with $M_1=M_2=Si$) and has cross-linking functional groups ($R_1$) comprising —NH functional end groups and $—(CH_2)_2—PO_3H_2$ proton carrier functional groups ($R_2$). The exemplary polymer electrolyte of FIG. 2b comprises perfluorosulfonic acid ionomer 1 cross-linked via acid-base bonding at locations 3 to copolymer 2. Here, copolymer 2 is a silicon oxide network (with $M_1=M_2=Si$) and has 3-(1H-benzimidazol-2-yl)propyl cross-linking functional groups ($R_1$) and $—(CH_2)_2—PO_3H_2$ proton carrier functional groups ($R_2$).

The amount of copolymer additive to be used in the electrolyte will depend on several factors. Preferably, a minimal amount of additive is used to obtain the desired results. A common range might be from about 5-10% by weight although amounts outside this range can certainly be considered.

When used as an electrolyte in solid polymer electrolyte fuel cells, the electrolyte of the invention provides for improved durability over the ionomer alone and also other benefits. While primarily intended for use as the membrane electrolyte in such fuel cells, the inventive electrolyte may also be considered for use elsewhere, for instance in a catalyst layer for either the cathode or anode, or in a coating in the gas diffusion layers or electrodes.

The electrolyte of the invention can be prepared in various ways. A general method involves mixing an amount of the copolymer with an amount of the proton conducting ionomer, and then heating the mixture such that the copolymer bonds to the proton conducting ionomer. An approach for accomplishing this comprises preparing the copolymer, adding the copolymer to a dispersion comprising the proton conducting ionomer, and removing solvent from the dispersion to provide a solid mixture of the copolymer and the proton conducting ionomer. The solid mixture is then heated to complete the preparation.

Another possible approach involves making the copolymer in situ in a dispersion with the proton conducting ionomer. Here for instance, the metal oxide monomers with cross-linking functional groups and the metal oxide monomers with other functional groups can be added to a dispersion comprising the proton conducting ionomer. The solvent is then removed from the dispersion thereby providing a solid mixture of the copolymer and the proton conducting ionomer. And, the solid mixture is then heated completing the preparation.

Yet another approach comprises preparing the copolymer first, adding the copolymer to a dispersion comprising a precursor for the proton conducting ionomer, and removing solvent from the dispersion thereby providing a solid mixture of the copolymer and the precursor. This mixture is then heated to complete the cross-linking reaction and then followed by acid treatment to convert the precursor to the proton conducting ionomer.

In the above, the copolymer additives are therefore preferably water, alcohol, or acid soluble. Certain desirable copolymers may be commercially obtained. Alternatively, a desired copolymer may be prepared by preparing a solution comprising appropriate metal oxide monomers with cross-linking functional groups and appropriate metal oxide monomers with other functional groups, and heating this solution to a reaction temperature for a period of time to form the copolymer in solution.

The metal oxide monomers with cross-linking functional groups used in such a method may be prepared by hydrolyzing unhydrolyzed metal oxide monomers with cross-linking functional groups. Exemplary unhydrolyzed metal oxide monomers with cross-linking functional groups include 3-aminopropyl-trimethoxysilane, aminophenyltrimethoxysilane, or 3-(1H-benzimidazol-2yl)propyl-trimethoxysilane.

Further, the metal oxide monomers with other functional groups can be prepared by hydrolyzing unhydrolyzed metal oxide monomers with other functional groups. Exemplary unhydrolyzed metal oxide monomers with other functional groups include (2-diethylphosphatoethyl)triethoxysilane and 3-nitro-4-amino-phenyl-triethoxysilane.

With regards to both types of metal oxide monomers, the hydrolyzing step and the making of the copolymer can be performed in the same solution.

Fuel cells comprising the prepared electrolyte can be made in a conventional manner. For instance, a dispersion/solution comprising the prepared electrolyte can be used to cast membrane electrolyte, to prepare catalyst layers, or otherwise be incorporated into membrane electrode assemblies as desired. In particular, a membrane can be cast directly from the mixture dispersion/solution. In another embodiment, a catalyst can be mixed with the ionomer dispersion/solution containing the additive to make an ink, and then the ink can be coated onto a membrane to make a catalyst coated membrane.

The electrolytes of the invention offer many potential advantages in fuel cells depending on the copolymers employed and the functional groups involved. The copolymer additives and the electrolytes comprising them can be quite facile to synthesize. The metal-oxide backbone in the copolymer can improve thermal stability of the membrane electrolyte, and help retain water therein at high temperature, thus improving durability and also performance at high temperature and low humidity conditions. The cross-linking between the copolymer additive and the host ionomer prevents the copolymer additive from being leached out during operation and improves the dimensional stability of the membrane electrolyte. With proton carrier functional groups present, the protons can be self-dissociated from the anion, even without water molecule facilitation, such that the performance of the membrane electrolyte even under dry condition can be improved. With metal ion chelating groups present, metal ions in the membrane electrolyte can be inactivated, consequently reducing or inhibiting free radical formation therein. And with free radical scavenger functional groups present, free radicals can be trapped again improving membrane durability.

The following examples are illustrative of the invention but should not be construed as limiting in any way.

EXAMPLES

Several different improved additives were prepared and incorporated into improved polymer membrane samples as described below. In addition, two conventional polymer membrane samples were prepared for comparative purposes.

The improved additives were generally prepared by first making appropriate cross-linking monomers and proton carrier monomers. The copolymer additives were then usually made by polymerizing a plurality of both monomer types together from a suitable mixture. In one case however, cross-linking monomer synthesis and polymerization was done concurrently. Finally, membrane samples were prepared by adding a desired amount of additive to dispersions of perfluorosulfonic acid (PFSA) ionomer with equivalent weights (EW) of either 830 or 950, mixing while stirring overnight, degassing the solution, and casting samples onto a glass plate. After evaporating off the solvent at room temperature for 2 hours, the obtained membrane samples were annealed at 150° C. for 1 hour.

The preparation details specific to each Example were as follows:

Inventive Membrane Examples 1a, 1b, 1c, and 1d

Preparation of Silicon Oxide Monomer with Proton Carrier Functional Group:

48 g of (2-diethylphosphatoethyl)triethoxysilane (EPETES) was hydrolyzed in a three-necked flask equipped with a condenser by dissolving in 250 ml of 37% hydrochloric acid while nitrogen bubbled into the solution. The solution was heated to 85° C. and maintained there under constant stirring for 24 h. The product was then cooled to 50° C. and the hydrochloric acid removed under reduced pressure. A light yellow, viscous product was obtained with a yield of 95%. 5 g of this product was then added to 15 g of alcohol to make a 25% wt/wt hydrolyzed EPETES solution. The hydrolysis reaction here is shown in equation 1 below:

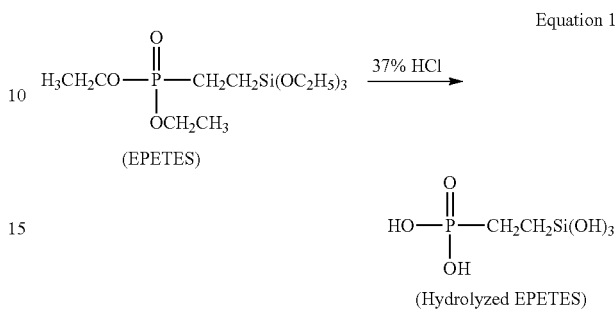

Preparation of Silicon Oxide Monomer with Cross-Linking Functional Group:

0.92 g (5.13 mmol) of 3-aminopropyl-trimethoxysilane (APMS) was hydrolyzed in a round flask in 25 g of alcohol solution comprising 0.1 ml of 2M hydrochloric acid and 2.77 g of water at 50° C. for 24 h. The monomer was left in solution here in order to prepare the copolymer additive below. The hydrolysis reaction here is shown in equation 2 below:

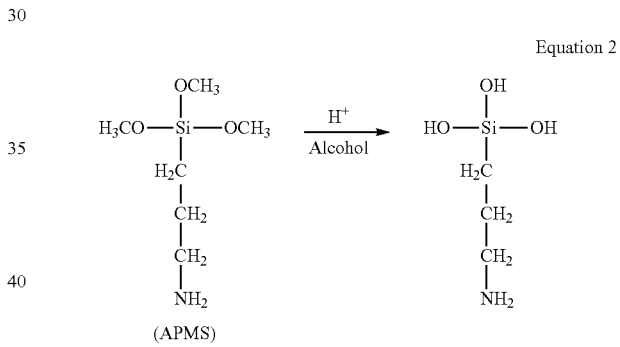

Preparation of First Silicon Oxide Copolymer Additive with N:P of 1:9:

34 g (45.2 mmol) of the above 25% hydrolysed EPETES alcohol solution was added to the above hydrolyzed APMS solution and allowed to react at 50° C. for 3 days. The solution was then filtered and washed to provide a white, water insoluble solid powder. The molar ratio of APMS to EPETES was 1:9 and hence the N:P (nitrogen:phosphorus) ratio was 1:9. The reaction here is given by equation 3 below:

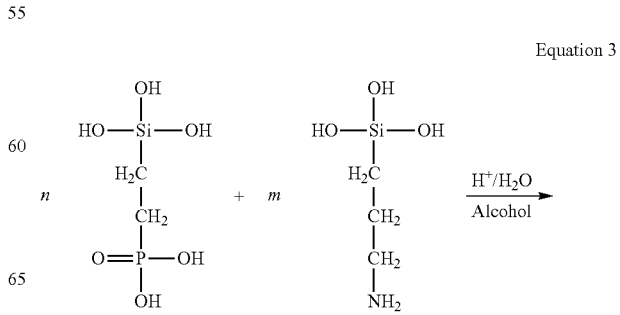

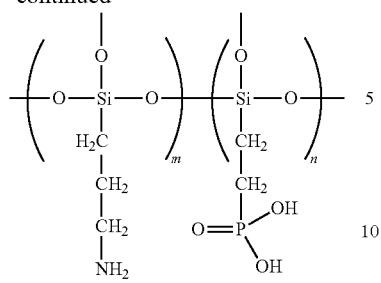

m = 0.1:n = 0.9

Preparation of Second Silicon Oxide Copolymer Additive with N:P of 3:7:

A hydrolyzed APMS solution was prepared in a like manner to the above and comprised 2.04 g APMS in 40 g of alcohol solution comprising 0.2 ml of 2M HCl and 5 g of water. 47 g of this hydrolyzed APMS solution was then added to 26.6 mmol of the above 25% hydrolysed EPETES alcohol solution and allowed to react at 50° C. for 3 days. Again, the solution was then filtered and washed to provide a white, water insoluble solid powder. This time, the molar ratio of APMS to EPETES was 3:7 and hence the N:P (nitrogen:phosphorus) ratio was also 3:7.

Composite membrane samples were then prepared with each additive as described generally above. Two different amounts were used and ionomer dispersions having two different EW of 830 and 950 were used. The composite membrane samples were:

Inventive membrane 1a: 10% by weight of the first silicon oxide copolymer additive having N:P of 1:9 in PFSA ionomer host with EW of 950.

Inventive membrane 1b: 10% by weight of the second silicon oxide copolymer additive having N:P of 3:7 in PFSA ionomer host with EW of 950.

Inventive membrane 1c: 5% by weight of the first silicon oxide copolymer additive having N:P of 1:9 in PFSA ionomer host with EW of 950.

Inventive membrane 1d: 10% by weight of the first silicon oxide copolymer additive having N:P of 1:9 in PFSA ionomer host with EW of 830.

Inventive Membrane Example 2

Preparation of Silicon Oxide Monomer with Proton Carrier Functional Group:

Hydrolyzed EPETES was prepared again as described in Example 1 above.

Preparation of Silicon Oxide Monomer with Cross-Linking Functional Group:

0.79 g (3.70 mmol) of p-aminophenyltrimethoxysilane (APS) was hydrolyzed in a round flask in 80 ml of 2M HCl at 50° C. for 24 h. Again, the monomer was left in solution here in order to prepare the polymer additive below. The hydrolysis reaction here is shown in equation 4 below:

Equation 4

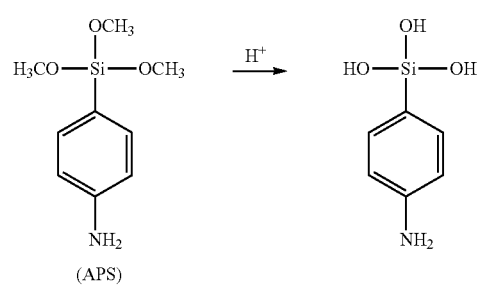

Preparation of Silicon Oxide Copolymer Additive:

25.10 g (33.3 mmol) of the 25% hydrolysed EPETES solution was added to the above hydrolyzed APS solution and allowed to react at 50° C. for 3 days. The molar ratio of APS to EPETES, and hence the N:P ratio, was 1:9. The hydrochloric acid was removed under reduced pressure to provide a light pink powder. The reaction here is given by equation 5:

Equation 5

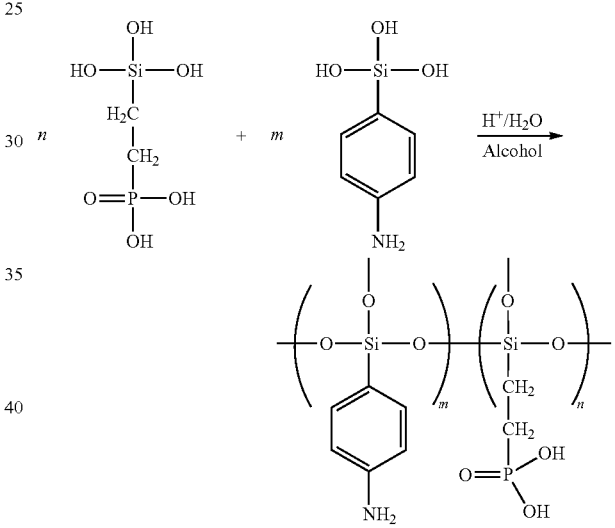

m = 0.1:n = 0.9

Composite membrane samples were then prepared with this additive as described generally above and are denoted as Inventive membrane 2. All had the same composition of 10% by weight of the silicon oxide copolymer additive having N:P of 1:9 in PFSA ionomer host with EW of 950.

Inventive Membrane Example 3

Preparation of Silicon Oxide Monomer with Proton Carrier Functional Group:

Hydrolyzed EPETES was prepared again as described in Example 1 above.

Preparation of Silicon Oxide Monomers with Cross-Linking Functional Groups and with Free Radical Scavenger Groups:

3-aminopropyl-trimethoxysilane (APMS) and 3-nitro-4-amino-phenyl-triethoxysilane (NPS) were obtained from a chemical supplier.

Preparation of Silicon Oxide Copolymer Additive:

0.5 g (2.788 mmol) of 3-aminopropyl-trimethoxysilane (APMS), 0.79 g (2.788 mmol) of 3-nitro-4-amino-phenyltriethoxysilane (NPS), and 4.20 g (22.3 mmol) hydrolyzed EPETES were placed in a round flask and stirred using a magnetic stir bar. 1.505 g of water and 100 g of alcohol were added while stirring and then 0.1 ml of 2M HCl was added and allowed to react at 50° C. for 3 days. The molar ratio of APMS to NPS to EPETES was 1:1:8. The solution was then filtered and washed to provide a white, water insoluble, solid powder. The reaction here is given by equation 6:

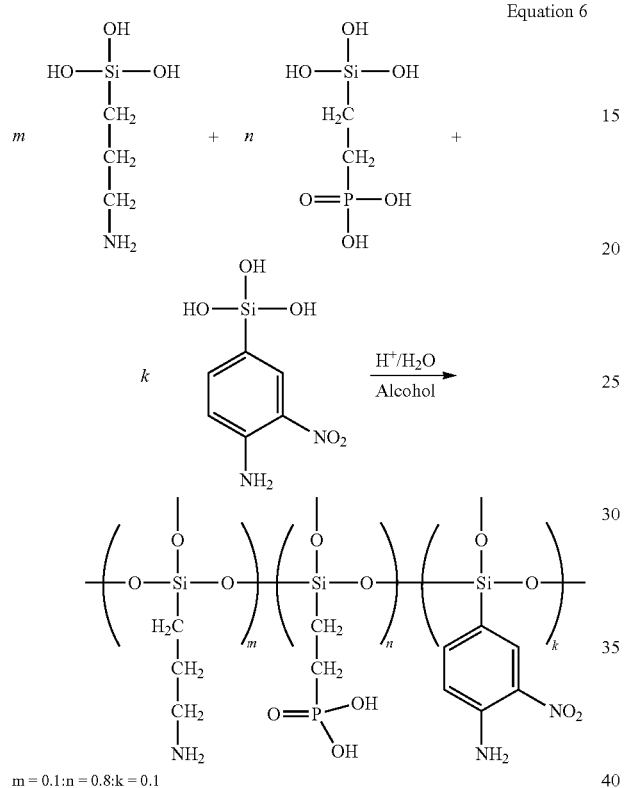

Composite membrane samples were then prepared with this additive as described generally above and are denoted as Inventive membrane 3. All had the same composition of 10% by weight of the silicon oxide copolymer additive having APMS:NPS:EPETES ratio of 1:1:8 in PFSA ionomer host with EW of 950.

Inventive Membrane Example 4

Preparation of Silicon Oxide Monomer with Proton Carrier Functional Group:

Hydrolyzed EPETES was prepared again as described in Example 1 above.

Combined Hydrolysis of Silicon Oxide Monomer with Cross-Linking Functional Group and Preparation of Silicon Oxide Copolymer Additive:

0.45 g (1.78 mmol) of 3-(1H-benzimidazol-2-yl)propyl-trimethoxysilane (BIMS) and 3.01 g (16.0 mmol) of hydrolyzed EPETES were placed in a round flask and stirred using a magnetic stir bar. The molar ratio of BIMS to EPETES, and hence the N:P ratio, was 1:9. 0.96 g of water and 100 g of alcohol were added while stirring and then 0.1 ml of 2M HCl was added and allowed to react at 50° C. for 3 days. The solution was then filtered and washed to get a white, water insoluble, solid powder. Here, the BIMS hydrolysis and the polymerization reactions occur concurrently and are given by equations 7 and 8 below respectively:

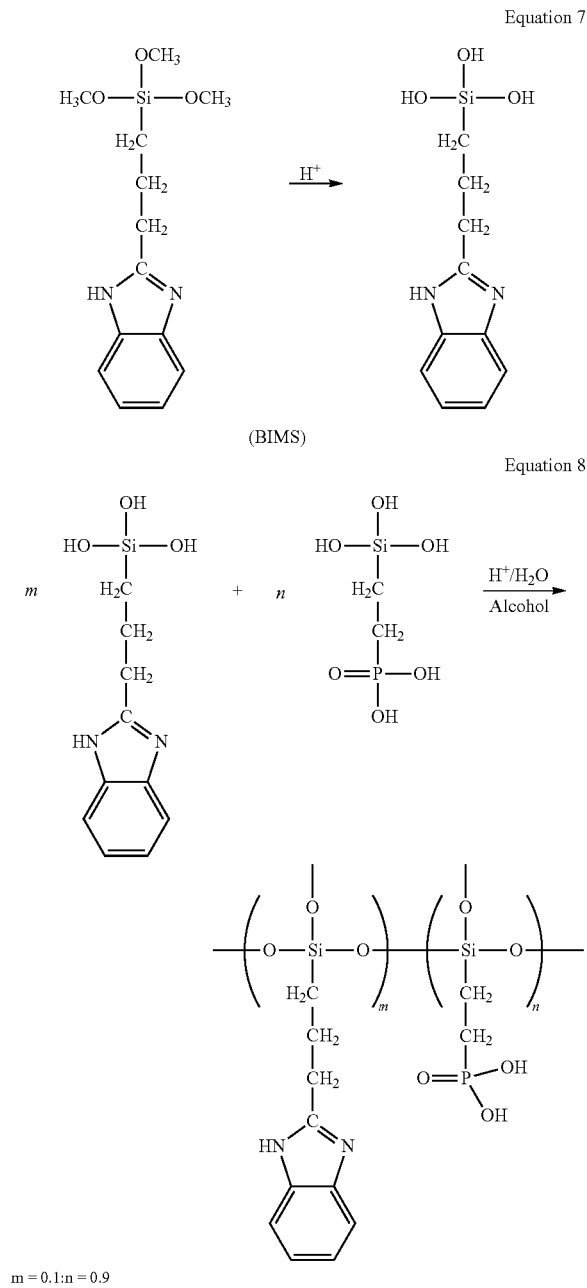

Composite membrane samples were then prepared with this additive as described generally above and are denoted as Inventive membrane 4. All had the same composition of 10% by weight of the silicon oxide copolymer additive having a N:P of 1:9 in PFSA ionomer host with EW of 950.

Comparative Membrane Examples PFSA 830EW, PFSA 950EW and NRE211

For comparison purposes, conventional membranes without additive were cast from a dispersion of perfluorosulfonic acid (PFSA) ionomer having equivalent weights of either EW830 or EW950 (hereinafter referred as PFSA 830EW and PFSA 950EW respectively). In addition, a commercially available polymer membrane was also obtained, namely DuPont™ Nafion® PFSA NRE211 membrane, hereinafter referred to as NRE211.

The preceding inventive composite membrane samples and comparative membrane samples were then evaluated and compared in various ways as summarized below.

Glass Transition Temperature (Tg) of Membrane

Glass transition temperatures (Tg) of Inventive membranes 1a, 1b and comparative PFSA 950EW were determined from dynamic mechanical analysis (DMA) measurements carried out using a DMA 800. Table 1 compares the Tg values for the samples studied.

TABLE 1

| Membrane sample | N:P ratio | Tg (° C.) |
| --- | --- | --- |
| PFSA 950EW | NA | 93 |
| Inventive membrane 1a (with 10% additive) | 1:9 | 130 |
| Inventive membrane 1b (with 10% additive) | 3:7 | 169 |

As is evident from Table 1, the thermal stability of the Inventive composite membranes are markedly improved compared to that of the conventional PFSA 950EW membrane. The Tg values of the former are substantially higher than the latter. Further, the membrane sample comprising 10% of the Inventive Example 1b additive has a greater amount of the cross-linking functional groups (greater N:P ratio) and as a result shows a substantially higher Tg than the membrane sample with the same amount of the Inventive Example 1a additive.

Membrane Stability in Dimethylacetamide (DMAc)

The extent to which membrane samples are cross-linked can be determined qualitatively using a simple solubility test in DMAc solvent. 2 square centimeter pieces of a comparative NRE211 sample and an inventive membrane sample comprising 10% by weight of Inventive Example 1b additive were placed in separate vials containing 25 ml DMAc at 50° C. After 3 days, the NRE211 sample had broken up into small pieces and after 15 days, it had dissolved completely. After 3 days, the inventive membrane sample had swelled but otherwise remained unchanged after 15 days.

The inventive cross-linked membrane sample clearly showed increased solvent resistance to that of the comparative NRE211 membrane in DMAc solvent.

Membrane Conductivity

The in-plane proton conductivity of the inventive sample comprising 5% of the Inventive Example 1c additive along with a comparative PFSA 950EW membrane were determined by checking the AC impedance of samples using a four-probe technique and a Solarton FRA 1260 frequency response analyzer. The scanning frequencies ranged from 10 MHz to 100 Hz and the samples were held at the test conditions for 6 h in order to reach equilibrium before measurements were made. Measurements were made at 80° C. and two different relative humidities (RH) of 30% and 50%. The results are summarized in Table 2.

TABLE 2

| Membrane sample | Conductivity at 80° C. 30% RH (S/cm) | Conductivity at 80° C. 50% RH (S/cm) |
| --- | --- | --- |
| PFSA 950EW no additive | 0.0040 | 0.019 |
| Inventive membrane 1c (with 5% additive) | 0.0049 | 0.021 |

The conductivity of the inventive sample was similar to that of the comparative PFSA 950EW sample at 50% RH and better at 30% RH.

Performance of Membrane Electrode Assemblies (MEA)

Test fuel cells were assembled with some of the preceding Inventive membrane samples 1a and 1d in order to compare their performance to that of the conventional membranes comprising the same base ionomer. Individual MEAs were made by bonding the appropriate membrane sample between cathode and anode electrodes. The cathode and anode had Pt loadings of 0.7 mg/cm$^2$ and 0.3 mg/cm$^2$ respectively. Performance evaluation was carried out using a single cell stack with 50 cm$^2$ of active area hardware.

Performance was evaluated by obtaining polarization curves (voltage versus current) at different relative humidities for the inlet reactant gases (35, 50 and 95%) and temperatures (95° C. and 120° C.). In all cases, testing was done using hydrogen at the anode, air at the cathode, and at gas stoichiometries of 9 and 12 respectively. Table 3 shows the voltage obtained at 1 A/cm$^2$ in each case.

TABLE 3

| Membrane sample | Voltage at 95° C. & 95% RH | Voltage at 95° C. & 50% RH | Voltage at 95° C. & 35% RH | Voltage at 120° C. & 50% RH | Voltage at 120° C. & 35% RH |
| --- | --- | --- | --- | --- | --- |
| PFSA 950EW | 0.702 | 0.604 | 0.538 | 0.551 | 0.420 |
| Inventive membrane 1a (10% additive & PFSA 950EW) | 0.681 | 0.609 | 0.547 | 0.577 | 0.485 |
| PFSA 830EW | 0.692 | 0.623 | 0.554 | 0.588 | 0.481 |
| Inventive membrane 1d (10% additive & PFSA 830EW) | 0.684 | 0.615 | 0.555 | 0.582 | 0.499 |

From Table 3, it can be seen that the effect of additive on membrane performance is a function of temperature and RH. The performance of the inventive membranes is competitive with, and under certain conditions, an improvement over that of the conventional membranes. And in general, for a given host ionomer, the lower the RH and the higher the temperature (e.g. 35% RH and 120° C.), the more the additive improves performance. Thus, such additives are well suited for improving performance in fuel cells operating at relatively high temperatures and/or low RH.

Durability of Membrane Electrode Assemblies

The relative durability of MEAs can be evaluated by setting fuel cells made with test MEAs in an open circuit condition in order to accelerate chemical decay of the membrane therein. The rate of decay at open circuit voltage (OCV) can be indicative of membrane chemical stability. MEAs made with Inventive membrane sample 1a and Comparative membrane PFSA 950EW were tested and compared. Here, 3-cell stacks were made using the same method and hardware as in the preceding example.

The test stacks were evaluated under OCV conditions at 30% relative humidity (RH) and 95° C. The supplied gas flow-rates were 3.5 and 11 slpm for hydrogen and air respectively. The OCV of each cell in the stack was monitored over time. Testing was stopped when the OCV in any one of the 3 cells in the stack reached 0.75 V. In addition, the amount of fluoride released as a result of decomposition of the membrane was determined over time (i.e. the fluoride release rate) by measuring the fluoride ion found in both the cathode and anode outlet water.

Figure 3:
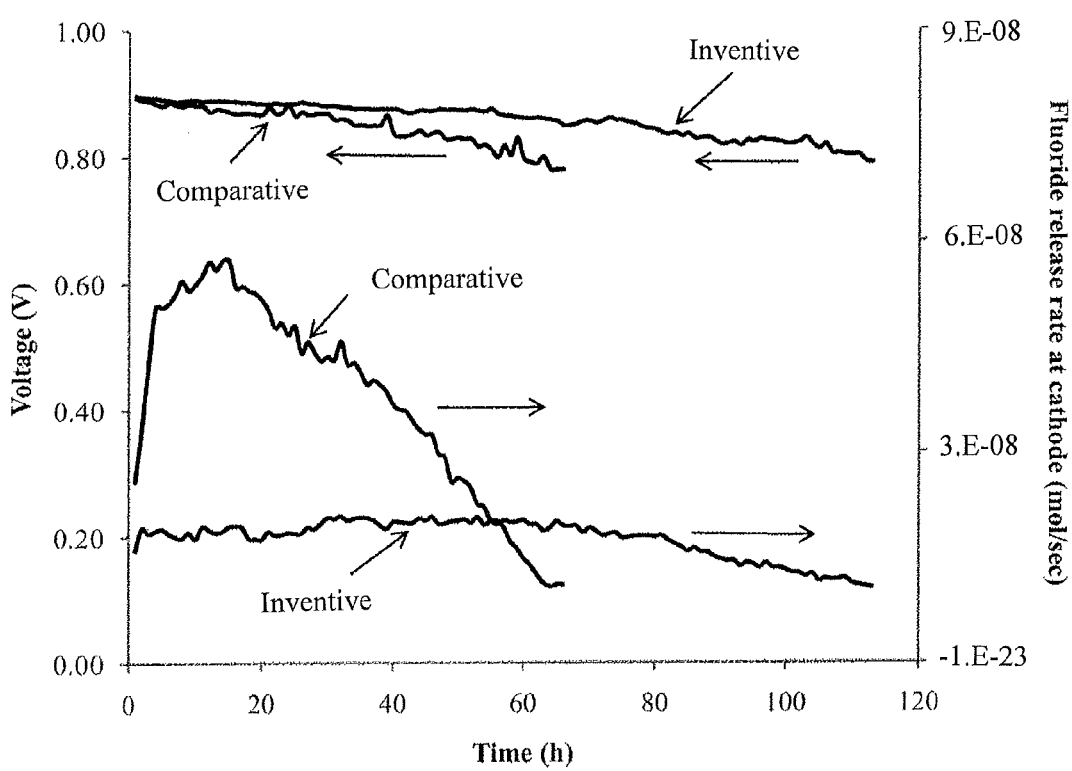
FIG. 3 shows a plot of the open circuit voltage and fluoride release rate versus time for the tested stacks in the Examples.

FIG. 3 shows plots of OCV and fluoride release rate versus time for the tested stacks. The OCV decay rate of the stack made with Inventive membranes 1a was 0.0008 V/h, while that of the stack made with Comparative membranes PFSA 950EW was 0.0015 V/h. The former failed at 113 h, while the latter failed at 66 h. And, the fluoride release rate for the stack made with Inventive membranes 1a was much lower than that of the stack made with Comparative membranes PFSA 950EW.

The stacks made with the Inventive membrane showed superior durability compared to that of the conventional stack.

All of the above U.S. patents, U.S. patent application publications, U.S. patent applications, foreign patents, foreign patent applications and non-patent publications referred to in this specification, are incorporated herein by reference in their entirety.

While particular elements, embodiments and applications of the present invention have been shown and described, it will be understood, of course, that the invention is not limited thereto since modifications may be made by those skilled in the art without departing from the spirit and scope of the present disclosure, particularly in light of the foregoing teachings. Such modifications are to be considered within the purview and scope of the claims appended hereto.

What is claimed is:

1. A proton conducting polymer electrolyte comprising a proton conducting ionomer and a polymetaloxane copolymer additive, wherein the polymetaloxane copolymer additive, prior to addition, comprises (i) cross-linking functional groups and (ii) other functional groups, and wherein, in the proton conducting polymer electrolyte, the ionomer and copolymer additive are covalently bonded or acid-base complexed together at the cross-linking functional groups of the polymetaloxane copolymer, wherein: the polymetaloxane copolymer prior to addition comprises a polymerized network of a plurality of metal oxide monomers with the cross-linking functional groups and a plurality of metal oxide monomers with the other functional groups, in random or block sequence, wherein:

the metal oxide monomers with the cross-linking functional groups comprise:

a first metal bonded to at least two oxygen atoms and selected from the group consisting of Si, Ti, Zr, Ce, Ta, and Cr; and the cross-linking functional groups bonded to the first metal and comprising a functional end group containing nitrogen or oxygen and characterized by a chemical structure selected from the group consisting of —NH$_2$, =NH, -(aliphatic) —OH, -(aryl)-OH,

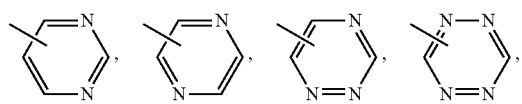

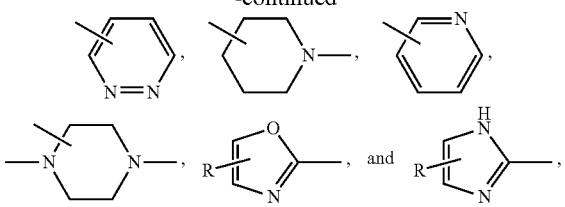

wherein R is a hydrocarbon group; and the metal oxide monomers with other functional groups comprise:

a second metal bonded to at least two oxygen atoms and selected from the group consisting of Si, Ti, Zr, Ce, Ta, and Cr; and the other functional groups bonded to the second metal and selected from the group consisting of:

i) proton carrier functional groups comprising a functional end group selected from the group consisting of —PO$_3$H$_2$, —COOH, —SO$_3$H, and —SO$_2$NHSO$_2$CF$_3$, ii) metal chelating functional groups comprising a functional end group selected from the group consisting of phosphonic acid, bipyridine, phenanthroline, and derivatives thereof, and iii) free radical scavenger functional groups comprising a functional end group selected from the group consisting of aminophenyl, hydroxyphenyl and derivatives thereof.

2. The electrolyte of claim 1, wherein the first and second metals are the same.

3. The electrolyte of claim 2, wherein the first and second metals are Si.

4. The electrolyte of claim 1, wherein the cross-linking functional groups have a chemical structure of the form —X-(end group) wherein X is a linear chain comprising a number of CH$_2$, O, NH, or aryl groups in random sequence.

5. The electrolyte of claim 4, wherein the cross-linking functional groups are —(CH$_2$)$_3$—NH$_2$, -phenyl-NH2, or —(CH$_2$)$_3$-(1H-benzimidazol-2-yl).

6. The electrolyte of claim 1 wherein the other functional groups are proton carrier functional groups comprising an end group selected from the group consisting of —PO$_3$H$_2$, —COOH, —SO$_3$H and —SO$_2$NHSO$_2$CF$_3$.

7. The electrolyte of claim 6, wherein the proton carrier functional groups have a chemical structure of the form —Y-(end group) wherein Y is a linear chain comprising a number of CH$_2$, CF$_2$, or aryl groups in random sequence.

8. The electrolyte of claim 7, wherein the proton carrier functional groups are —(CH$_2$)$_2$—PO$_3$H$_2$.

9. The electrolyte of claim 7, wherein the cross-linking functional groups are —(CH$_2$)$_3$—NH$_2$, -phenyl-NH$_2$, or —(CH$_2$)$_3$-(1H-benzimidazol-2-yl) and the proton carrier functional groups are —(CH$_2$)$_2$—PO$_3$H$_2$.

10. The electrolyte of claim 9 wherein the ratio of cross linking functional groups to proton carrier functional groups in the copolymer is from about 1:9 to 3:7.

11. The electrolyte of claim 1, wherein the polymerized network comprises at least two different metal oxide monomers with other functional groups.

12. The electrolyte of claim 11, wherein the polymerized network comprises a plurality of metal oxide monomers with proton carrier functional groups and a plurality of metal oxide monomers with free radical scavenger functional groups.

13. The electrolyte of claim 12, wherein the free radical scavenger functional groups are -3-nitro-4-amino-phenyl.

14. The electrolyte of claim 1, wherein the proton conducting ionomer comprises sulfonic acid groups.

15. The electrolyte of claim 14, wherein the proton conducting ionomer is perfluorosulfonic acid ionomer.

16. The electrolyte of claim 15, wherein the amount of copolymer is from about 5% to 10% by weight of the electrolyte.

17. The electrolyte of claim 1 comprising the proton conducting ionomer and the amount of a copolymer comprising cross-linking functional groups and other functional groups and excluding a basic ionomer.

18. A polymer electrolyte fuel cell comprising the electrolyte of claim 1.

19. The polymer electrolyte fuel cell of claim 18, wherein the fuel cell is for operation at temperatures greater than 95° C. and relative humidity less than 50% RH.

* * * * *